(12) United States Patent
Nakashima

(10) Patent No.: US 7,512,491 B2
(45) Date of Patent: Mar. 31, 2009

(54) NAVIGATION DEVICE FOR A VEHICLE

(75) Inventor: Makoto Nakashima, Nagoya (JP)

(73) Assignee: DENSO CORPORATION, Kariya (JP)

( * ) Notice: Subject to any disclaimer, the term of this patent is extended or adjusted under 35 U.S.C. 154(b) by 524 days.

(21) Appl. No.: 11/376,222

(22) Filed: Mar. 16, 2006

(65) Prior Publication Data

US 2006/0235607 A1 Oct. 19, 2006

(30) Foreign Application Priority Data

Apr. 13, 2005 (JP) ............................. 2005-116171

(51) Int. Cl.
*G01C 21/00* (2006.01)
*G06F 17/00* (2006.01)
(52) U.S. Cl. .................... 701/211; 701/70; 701/204
(58) Field of Classification Search ................ 701/201, 701/204, 207, 208, 210, 211, 29, 36, 41, 701/70; 340/995.12
See application file for complete search history.

(56) References Cited

U.S. PATENT DOCUMENTS 6,320,518 B2 * 11/2001 Saeki et al. ............ 340/995.12
6,704,647 B1 * 3/2004 Monde et al. ............... 701/208

FOREIGN PATENT DOCUMENTS

| JP | A-H7-098233 | 4/1995 |
|---|---|---|
| JP | A-08-210865 | 8/1996 |
| JP | A-H10-019594 | 1/1998 |
| JP | A-10-047984 | 2/1998 |
| JP | A-2000-353294 | 12/2000 |
| JP | A-2002-303527 | 10/2002 |
| JP | A-2003-262530 | 9/2003 |

OTHER PUBLICATIONS

Office Action dated Nov. 19, 2008 in corresponding Japanese Application No. 2005-116171 (and English Translation).

* cited by examiner

*Primary Examiner*—Tan Q Nguyen
(74) *Attorney, Agent, or Firm*—Posz Law Group, PLC

(57) ABSTRACT

A navigation device for a vehicle comprises a current position detection unit for detecting a current position of the vehicle and a control unit. The control unit executes, when the detected current position approaches a point of guidance along a route, route guidance indicating a path to be taken at the point of guidance in order to go through the point of guidance along the route. The control unit also estimates a degree of traveling stability of a vehicle in traveling on a road and controls a timing to execute the route guidance so that the timing becomes earlier when the estimated degree of the traveling stability is smaller.

10 Claims, 2 Drawing Sheets

NAVIGATION DEVICE FOR A VEHICLE

CROSS REFERENCE TO RELATED APPLICATION

This application is based on and incorporates herein by reference Japanese patent application No. 2005-116171 filed on Apr. 13, 2005.

FIELD OF THE INVENTION

The present invention relates to a navigation device for a vehicle, which guides a driver along a route to a destination.

BACKGROUND OF THE INVENTION

A navigation device for a vehicle generally has route guidance function which executes route guidance for a driver of the vehicle when the vehicle approaches a point of guidance such as an intersection to turn, a diverting point, an entrance to a highway or an exit from the highway. In the route guidance, the navigation device causes a display device to display a magnified view of a map including the point of guidance and causes a sound device to output a voice announcing a route to take at the point of guidance such as "Turn left at a point xxx meters ahead."

In JP 2003-262530A, a navigation device is disclosed which is intended for executing the route guidance at a suitable timing. More specifically, this navigation device recursively estimates a period required to reach an intersection and gives the route guidance when the estimated period becomes lower than a predetermined period. This navigation device thus can initiate the route guidance while giving the driver the same time margin before reaching every point of guidance.

In addition, this navigation device changes a timing to execute the route guidance and a manner of executing the route guidance based on a condition such as driving skill of the driver, weather and brightness around the vehicle. This navigation device thus can execute the route guidance based on the driving skill of the driver or a condition surrounding the vehicle.

A degree of traveling stability of the vehicle changes depending on a condition of a road to travel and a condition of the vehicle. In the case that the tires of the vehicle are slippery, the tires tend to lock or skid and the degree of the traveling stability of the vehicle accordingly decreases. On an uphill road and a downhill road, loads on the tires become uneven. One of the tires under a lighter load is more likely to lock or spin out. It is desirable to avoid a driving operation such as a sudden braking or a sudden lane change when the degree of the traveling stability of the vehicle is low.

The point of guidance is a point at which the vehicle has to change its heading direction. The vehicle hence has to change a lane to travel on or reduce its speed before the point of guidance. The degree of the traveling stability of the vehicle may therefore become so low that the driver is given a time margin insufficient for changing the lane or reducing the speed after the route guidance made by the conventional navigation device.

SUMMARY OF THE INVENTION

It is therefore an object of the present invention to provide a navigation device for a vehicle which executes route guidance at a timing after which a driver has enough time to safely change a lane or decelerate the vehicle.

A navigation device for a vehicle includes a current position detection unit for detecting a current position of the vehicle and a control unit. The control unit gives, when the detected current position approaches the point of guidance along a route, route guidance indicating a path to be taken at the point of guidance in order to go through the point of guidance along the route. The control unit also estimates a degree of traveling stability of a vehicle in traveling on a road and controls a timing to give the route guidance so that the timing becomes earlier when the estimated degree of the traveling stability is smaller.

By virtue of the operation of the navigation device, the driver is given a sufficient time margin to control the vehicle safely to change the heading direction of the vehicle.

In another aspect, a navigation device for a vehicle includes a current position detection unit for detecting a current position of the vehicle, a storage unit for storing road map data, and a control unit. The control unit executes, when the detected current position approaches a point of guidance along a route, route guidance indicating a path to be taken at the point of guidance in order to go through the point of guidance along the route. The control unit also makes, based on the road map data and the detected current position, a determination whether the road on which the vehicle is traveling decreases the degree of traveling stability of the vehicle. The control unit further controls the timing to give the route guidance so that the timing becomes earlier when the determination is affirmative than when the determination is negative.

By virtue of the operation of the navigation device, the driver is also given a sufficient time margin to control the vehicle safely to change the heading direction of the vehicle. This is because the condition of the road on which the vehicle is traveling affects the degree of the traveling stability of the vehicle in traveling the road.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Figure 1:
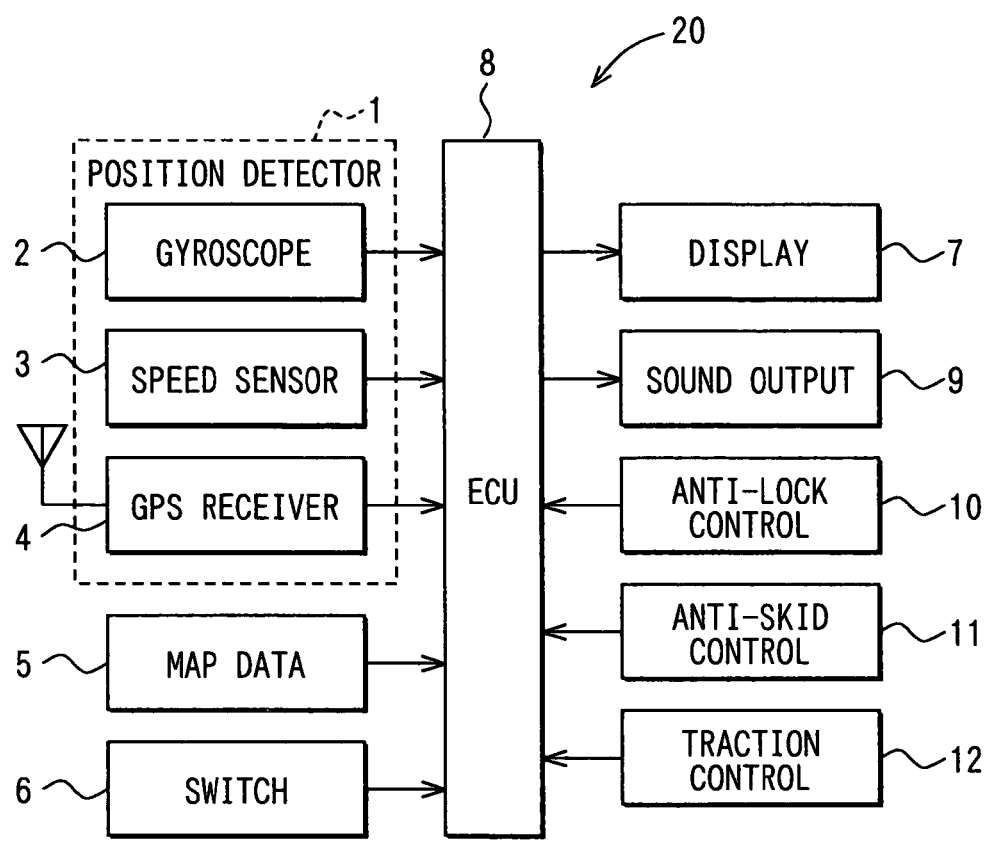
FIG. 1 is a block diagram of a navigation device for a vehicle according to an embodiment of the present invention.

Hereafter, a navigation device according to an embodiment of the present invention will be described with reference to FIGS. 1 and 2. As shown in FIG. 1, the navigation device 20 includes a position detector 1, a map data outputting device 5, operation switches 6, a display device 7, a sound outputting device 9 and a navigation ECU 8. An anti-lock controller 10, an anti-skid controller 11 and a traction controller 12 serve as a traveling status stabilizing device, are installed in the vehicle and are connected with the navigation ECU 8. The navigation ECU 8 estimates a degree of traveling stability of the vehicle, based on information related to traveling stability of the vehicle which is provided from the traveling status stabilizing device.

The navigation ECU 8 is a well-known computer including a CPU, a ROM, a RAM, an I/O and bus lines. The bus lines connect the CPU, the ROM, the RAM and the I/O with each other. The ROM stores programs which the navigation ECU 8 executes. The CPU makes calculations according to the programs.

The position detector 1 includes a gyroscope 2, a velocity sensor (or a distance sensor) 3 and a GPS (Global Positioning System) receiver 4, which are well-known and detect positions with different types of detection error. The navigation ECU 8 uses signals from the devices 2 to 4 in the position detector 1 in a complementary style to detect a current position and a heading direction of the vehicle. The position detector 1 may have only one or two of the devices 2 to 4. The position detector 1 may have other sensors for detecting the current position and the heading direction in place of the devices 2 to 4.

The map data outputting device 5 outputs to the navigation ECU 8 map data necessary for drawing a road map. The map data includes road map data and marking data. The road map data include node data and link data. The marking data describe names of locations. The map data outputting device 5 also includes a storage device for storing the map data. The storage device may be a CD-ROM, a DVD-ROM and a rewritable storage medium such as a memory card or a hard disk drive.

As known well in the art, the node data include node datasets for respective nodes at each of which roads intersect, join or diverge. Each of the node datasets includes a node ID, a node coordinate and a node name for a node corresponding to the node dataset. Each of the node datasets also includes connecting link IDs which indicate respective links connected with the corresponding node. Each of the node datasets also includes data indicating whether the corresponding node has a traffic signal, data indicating information on traffic control at the corresponding node, and data indicating a node cost of the corresponding node.

The link data include link datasets for respective links. Each link corresponds to a fraction of a road split at nodes. Each of the link datasets includes a link ID, a link length, and node coordinates at both ends of a link corresponding to the link dataset. Each of the link datasets also includes data indicating a road kind (e.g., a highway, a toll road, an ordinary road, an urban road, a suburb road) of the corresponding link, data indicating a road width of the corresponding link, the number of lanes in the corresponding link, data indicating time required to travel through the corresponding link, and data indicating speed limit of the corresponding link. Each of the link datasets also includes supplemental condition data such as data indicating that the corresponding link corresponds to an uphill road, corresponds to a downhill road, is on a bridge, or is curving.

By using the node data and the link data, it is possible to draw roads on a map and to find, through a well-known algorithm such as the Dijkstra algorithm, a path from a starting point to a destination.

The operation switches 6 include touch switches made together with the display device 7 as a single body, or include mechanical switches. The operation switches 6 are operated by a user to input data to the navigation ECU 8. For example, in making the navigation ECU 8 find a route from a starting point to a destination, the user can input the starting point, the destination or a passing point which the route has to go through. In many cases, however, the navigation ECU 8 sets the current position of the vehicle as the starting point. It is therefore unnecessary to input the passing point.

When the starting point and the destination are set, the navigation ECU 8 finds, by means of the Dijkstra algorithm, an optimum route from the starting point to the destination.

The navigation ECU 8 starts route guidance when the user operates the operation switches 6 to cause the navigation ECU 8 to start the route guidance.

The display device 7 includes, for example, a liquid crystal display and displays, caused by the navigation ECU 8, a vehicle mark indicating the current position of the vehicle and a road map around the vehicle mark which is composed by map data from the map data outputting device 5. In the route guidance, the display device 7 displays, caused by the navigation ECU 8, a road map in which the optimum route is emphasized. The display device 7, further in the route guidance, displays a magnified view of a map including a predetermined point of guidance, when the vehicle approaches to the point of guidance. The point of guidance is a point on the optimum route at which the driver needs intensive guidance regarding which path the vehicle should take through the point. For example, an intersection where the vehicle should turn left or right, a diverting point, an entrance to a highway and an exit from a highway can be the point of guidance.

The sound outputting device 9 makes, when the vehicle approaches the point of guidance, voice guidance for the optimum route, by outputting a voice announcing a path (or a direction) the vehicle should take in order to go through the point of guidance along the optimum path.

The anti-lock controller 10 includes wheel rotation speed sensors, brake actuators and an anti-lock ECU. The rotation speed sensors detect rotation speeds of respective wheels of the vehicle. The brake actuators control brake pressures of the respective wheels. The anti-lock ECU controls, in an anti-lock operation, operations of the brake actuators by outputting control signals to the brake actuators. More specifically, the anti-lock ECU calculates a slip ratio of each of the wheels based on a ratio of a rotation speed of the wheel to a travel speed of the vehicle. The anti-lock ECU controls the brake pressures to keep the slip ratios within a predetermined range. Thus, the anti-lock controller 10 can improve a degree of traveling stability of the vehicle in braking, by preventing the slip ratios of the wheels from increasing to a level where the wheels lock.

The anti-skid controller 11 includes a speed sensor, a steering sensor, a yaw rate sensor and an anti-skid ECU. The speed sensor detects the travel speed of the vehicle. The steering sensor detects an angle of rotation of the steering caused by a driver's operation. The anti-skid ECU outputs to an engine controller (not shown) of the vehicle a request signal for decreasing an engine power. The anti-skid ECU also outputs to the anti-lock controller 10 a request signal for operating the brake actuators and generating a braking force at one of the wheels.

In a situation of understeer, a yaw rate detected by the yaw rate sensor is smaller than a yaw rate calculated from the detected travel speed of the vehicle and the detected rotation angle of the steering. In this situation, the anti-skid controller 11 generates a revolving moment necessary to compensate lack of the detected yaw rate, by decreasing the engine power and generating a braking force at a rear inner wheel of the vehicle. In a situation of overrsteer where the detected yaw rate is larger than the calculated yaw rate, the anti-skid controller 11 generates a moment to cancel an excessive yaw rate, by generating a braking force at a front outer wheel of the vehicle. The front outer wheel is a front wheel at a lateral side of the vehicle receiving larger centrifugal force. By virtue of the operation of the anti-skid controller 11, the vehicle can revolve in a state of neutral steer and thus can increase the degree of the traveling stability.

The traction controller 12 mainly includes devices which are also included by the anti-skid controller 11. When a wheelspin occurs at a drive wheel in starting or accelerating the vehicle, the traction controller 12 tries to suppress the wheelspin by outputting to the engine controller a request signal for decreasing an engine power or by applying a braking pressure to the drive wheel.

Figure 2:
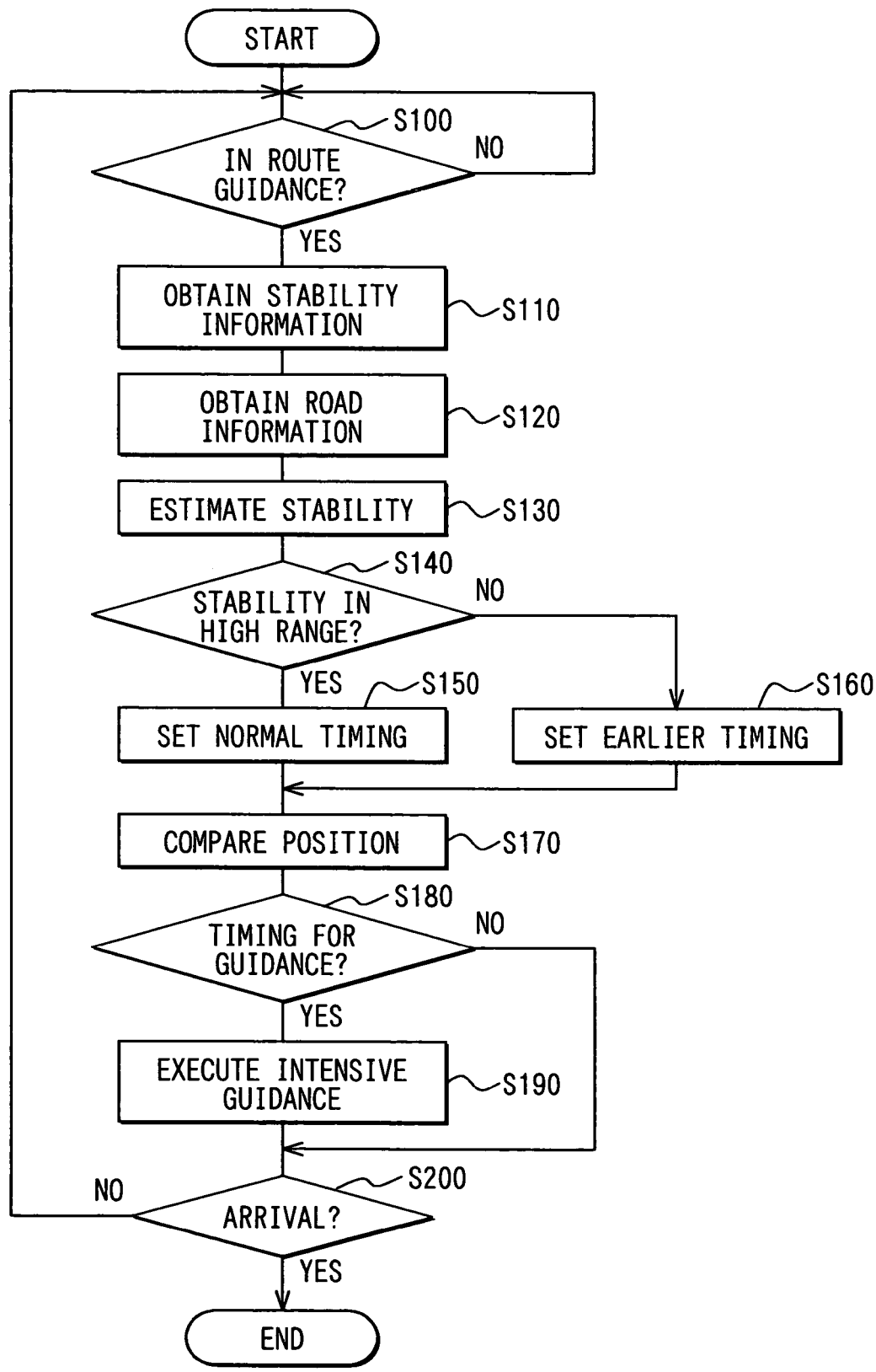
FIG. 2 is a flowchart showing an operation of route guidance which starts at a timing depending on a degree of a stability of the vehicle.

The navigation ECU 8 is programmed to perform a route guidance as shown in FIG. 2 for changing a timing for making intensive route guidance in its navigation operation.

First the navigation ECU 8 makes a determination at a step S100 whether the route guidance is being executed by the navigation ECU 8 itself. When the determination at the step S100 is affirmative (YES), the navigation ECU 8 subsequently executes a step S110.

At the step 110, the navigation ECU 8 obtains, from the traveling status stabilizing device, information related to the degree of the traveling stability of the vehicle. As described above, the traveling status stabilizing device detects through several sensors a status of the travel of the vehicle to make a determination whether the degree of the traveling stability is decreasing. When the determination is affirmative, the traveling status stabilizing device executes control operations to improve the degree of the traveling stability. Therefore, the navigation ECU 8 can estimate the degree of traveling stability of the vehicle by obtaining, from the traveling status stabilizing device, information related to the control operation, information on whether the degree of the traveling stability is decreasing, or information on the status of the travel.

The information related to the control operation includes information whether the anti-lock controller 10 has executed the anti-lock operation. By obtaining the information, the navigation ECU 8 can determine that the degree of the traveling stability is low or high according to whether or not the anti-lock operation has been executed. The information on whether the degree of the traveling stability is decreasing includes information on the detected slip ratios of the wheels. The navigation ECU 8 can determine that the degree of the traveling stability is low or high according to the information on the slip ratios. The information on the status of the travel includes information on the travel speed of the vehicle and the rotation speeds of the wheels. The navigation ECU 8 can determine that the degree of the traveling stability is low or high according to the information on the travel speed and the rotation speeds. The navigation ECU 8 can likewise determine that the degree of the traveling stability is low or high according to the information from the anti-skid controller 11 and the traction controller 12.

The information on the degree of the traveling stability of the vehicle which is obtained at the step S110 is stored until a period passes since the time when the information is obtained. The navigation ECU 8 estimates the degree of traveling stability of the vehicle based on all the past information which is obtained from the traveling status stabilizing device and is still stored.

Subsequently at a step S120, the navigation ECU 8 specifies, based on the current position of the vehicle and the map data, a road on which the vehicle is currently traveling. The navigation ECU 8 further obtains at the step S120 information related to a condition of the specified road based on the map data. When the obtained information of the condition indicates that the road is a slope, that the road is on a bridge, or that the road is curving, the stability of the vehicle gets worse. In the case that the specified road is an uphill road or a downhill road, loads on the wheels become uneven. One of the wheels under a lighter load is more likely to lock or spin out. In the case that the specified road is on a bridge, a possibility of locking or skidding tends to increase because a friction coefficient of a bridge is, in many cases, smaller than that of an ordinary road. In the case that the specified road is curving, a possibility of skidding increases.

At a step S130, the navigation ECU 8 estimates the degree of the traveling stability of the vehicle based on the information related to the stability of the vehicle obtained at the step S110 and the information related to the condition of the specified road obtained at the step S120. The navigation ECU 8 may estimate the degree of the traveling stability simultaneously in one way based on the information related to the stability of the vehicle and in the other way based on the information related to the condition of the specified road. The navigation ECU 8 may otherwise estimate the degree of the traveling stability by using in combination both the information related to the stability of the vehicle and the information related to the condition of the specified road.

At a step S140 the navigation ECU 8 determines whether the degree of the traveling stability estimated at the step S130 is classified in a high range or in a low range. When it is classified in the high range, the navigation ECU 8 then executes a step S150 to set a timing for intensive route guidance to a normal timing. When it is classified in the low range, the navigation ECU 8 then executes a step S160 to set a timing for intensive route guidance to an earlier timing.

The timing for the intensive route guidance may be set as a distance from the current position to a point of guidance. For example, when the estimated degree of the traveling stability is in the high range, the navigation ECU 8 may set the timing for the intensive route guidance so that it can initiate intensive route guidance when the vehicle comes to a point 300 m before the point of guidance. In contrast, when the estimated degree of the traveling stability is in the low range, the navigation ECU 8 may set the timing for the intensive route guidance so that it can initiate intensive route guidance when the vehicle comes to a point 500 m before the point of guidance.

Thus, when the estimated degree of the traveling stability is lower, the navigation ECU 8 may set the timing for the intensive route guidance so that it can initiate intensive route guidance when the vehicle comes to a point farther from the point of guidance. The timing for the intensive route guidance becomes earlier in the case that the estimated degree of the traveling stability is low than in the case that the estimated degree of the traveling stability is high.

The timing for the intensive route guidance may be set as a period required to reach from the current position to a point of guidance at a current travel speed of the vehicle. In this case, when the estimated degree of the traveling stability is in the low range, the navigation ECU 8 sets the period to be longer than when the estimated degree of the traveling stability is in the high range. The timing for the intensive route guidance thus becomes earlier in the case that the estimated degree of the traveling stability is low than in the case that the estimated degree of the traveling stability is high.

In the above example, the degree of the traveling stability of the vehicle is classified in one of the two ranges (i.e., the high range and the low range). However, the degree of the traveling stability may be classified in one of three or more ranges. In this case, the timing for the intensive route guidance is set to be earlier as a range becomes lower in which the estimated degree of the traveling stability is classified.

Subsequently at a step S170, the navigation ECU 8 compares the current position with the optimum route. Then at a step S180, the navigation ECU 8 makes, based on the comparison at the step S170, a determination whether the timing for the intensive route guidance has come. When the determination at the step S170 is affirmative, the navigation ECU 8 executes a step S190. When the determination at the step S170 is negative, the navigation ECU 8 executes a step S200.

At the step S190, the navigation ECU 8 executes the intensive route guidance of the point of guidance by causing the display device 7 to display a magnified map showing a path (or a heading direction) to be taken in passing through the point of guidance along the optimum route. At the step S190, the navigation ECU 8 also makes the intensive route guidance of the point of guidance by causing the sound outputting device 9 to output a voice to notify the driver of a heading direction to be taken in passing through the point of guidance along the optimum route. At the step S200, the navigation ECU 8 makes a determination whether the vehicle has arrived at the destination. When the determination at the step S200 is negative, the navigation ECU 8 executes the step S100 again.

The present invention should not be limited to the embodiment discussed above and shown in the figures, but may be implemented in various ways without departing from the spirit of the invention.

For example, the vehicle may have only one or two of the anti-lock controller 10, the anti-skid controller 11 and the traction controller 12.

The navigation ECU 8 may estimate the degree of the traveling stability of the vehicle based solely on the information related to the stability of the vehicle or solely on the information related to the condition of the specified road.

What is claimed is:

1. A navigation device for a vehicle, comprising:
   a current position detection unit for detecting a current position of the vehicle; and
   a control unit for:
      executing, when the detected current position approaches a point of guidance along a route, route guidance indicating a path to be taken at the point of guidance in order to go through the point of guidance along the route;
      estimating a degree of traveling stability of a vehicle in traveling on a road; and
      controlling a timing to execute the route guidance so that the timing becomes earlier as the estimated degree of the traveling stability becomes smaller.

2. The navigation device according to claim 1, wherein the control unit estimates the degree of the traveling stability based on information provided by a stabilizing device for stabilizing the vehicle in traveling, the stabilizing device being installed to the vehicle.

3. The navigation device according to claim 2, wherein the stabilizing device are one of an anti-lock controller, an anti-skid controller and a traction controller, wherein the anti-lock controller is for preventing a wheel of the vehicle from locking, the anti-skid controller is for preventing the vehicle from skidding, and the traction controller is for preventing a wheel-spin of the wheel.

4. The navigation device according to claim 1, further comprising:
   a storage unit for storing road map data,
   wherein the control unit;
      makes, based on the road map data and the detected current position, a determination whether the road on which the vehicle is traveling decreases the degree of traveling stability of the vehicle; and
      controls the timing to execute the route guidance so that the timing becomes earlier when the determination is affirmative than when the determination is negative.

5. The navigation device according to claim 4, wherein the control unit determines that the road on which the vehicle is traveling decreases the degree of traveling stability of the vehicle, when the road is one of an uphill road, a downhill road, a road on a bridge and a curving road.

6. The navigation device according to claim 1, wherein the control unit estimates the degree of the traveling stability based on information provided by a controlling device for controlling the vehicle in traveling, the controlling device being installed to the vehicle.

7. A navigation device for a vehicle, comprising:
   a current position detection unit for detecting a current position of the vehicle;
   a storage unit for storing road map data; and
   a control unit for:
      executing, when the detected current position approaches a point of guidance along a route, route guidance indicating a path to be taken at the point of guidance in order to go through the point of guidance along the route;
      making, based on the road map data and the detected current position, a determination whether the road on which the vehicle is traveling decreases the degree of traveling stability of the vehicle; and
      controlling the timing to execute the route guidance so that the timing becomes earlier when the determination is affirmative than when the determination is negative.

8. The navigation device according to claim 7, wherein the control unit:
   estimates a degree of traveling stability of a vehicle in traveling on a road; and
   controls a timing to execute the route guidance so that the timing becomes earlier as the estimated degree of the traveling stability becomes smaller.

9. A computer program product for route guidance, comprising:
   at least one computer-readable medium; and
   a computer program mechanism embedded in the medium for causing a computer to:
      execute, when a current position approaches a point of guidance along a route, route guidance indicating a path to be taken at the point of guidance in order to go through the point of guidance along the route;
      estimate a degree of traveling stability of a vehicle in traveling on a road; and
      control a timing to execute the route guidance so that the timing becomes earlier when the estimated degree of the traveling stability is smaller.

10. A computer program product for route guidance, comprising:
   at least one computer-readable medium; and
   a computer program mechanism embedded in the medium for causing a computer to:
   execute, when a current position approaches a point of guidance along a route, route guidance indicating a path to be taken at the point of guidance in order to go through the point of guidance along the route;
   make, based on the road map data and the detected current position, a determination whether the road on which the vehicle is traveling decreases the degree of traveling stability of the vehicle; and
   control the timing to execute the route guidance so that the timing becomes earlier when the determination is affirmative than when the determination is negative.

* * * * *